US012680990B2

(12) United States Patent (10) Patent No.: US 12,680,990 B2
Fujita et al. (45) Date of Patent: Jul. 14, 2026

(54) DATA PROCESSING METHOD AND DATA PROCESSING SYSTEM

(71) Applicant: SHIMADZU CORPORATION, Kyoto (JP)

(72) Inventors: Yuichiro Fujita, Kyoto (JP); Akira Nishio, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 470 days.

(21) Appl. No.: 17/888,806

(22) Filed: Aug. 16, 2022

(65) Prior Publication Data

US 2023/0097148 A1 Mar. 30, 2023

(30) Foreign Application Priority Data

Sep. 27, 2021 (JP) ................................. 2021-156832

(51) Int. Cl.
G01N 30/86 (2006.01)
G06F 18/2133 (2023.01)
G06F 18/22 (2023.01)

(52) U.S. Cl.
CPC ..... G01N 30/8631 (2013.01); G01N 30/8644 (2013.01); G06F 18/2133 (2023.01); G06F 18/22 (2023.01); *G06F 2218/10* (2023.01)

(58) Field of Classification Search
CPC ........ G01N 30/00; G01N 30/02; G01N 30/86; G01N 30/8624; G01N 2030/862;
(Continued)

(56) References Cited

U.S. PATENT DOCUMENTS 4,807,148 A * 2/1989 Lacey ................ G01N 30/8603
73/23.36
2016/0033457 A1 2/2016 Mishima et al.
(Continued)

FOREIGN PATENT DOCUMENTS

CN 105026926 A 11/2015
CN 107076712 A 8/2017
(Continued)

OTHER PUBLICATIONS

Jiang, et al.; "Resolution of HPLC-DAD data of chiral drugs with overlapping peaks by non-negative matrix factorization"; Journal of China Pharmaceutical University; 2006; 37 (5); pp. 432-437, with English translation.
(Continued)

*Primary Examiner* — Andrew Schechter
*Assistant Examiner* — Matthew W. Baca
(74) *Attorney, Agent, or Firm* — Renner, Otto, Boisselle & Sklar, LLP

(57) ABSTRACT

A data processing method includes a data preparing step of preparing actual data of a three dimensional chromatogram including a chromatogram and a spectrum acquired by chromatography analysis for a sample containing components, and spectral data for the components in the sample whose peaks overlap each other on the chromatogram a similarity calculating step of calculating, for each wavelength region, a similarity between wavelength regions corresponding to each other in the spectral data while comprehensively changing the wavelength regions a target range setting step of setting a target range by searching for a wavelength region having a similarity lower than an overall similarity between the spectral data based on a calculation result in the similarity calculating step and a peak separating step of creating chromatogram data for the
(Continued)

START

101 | PREPARE ACTUAL DATA OF THREE-DIMENSIONAL CHROMATOGRAM AND SPECTRAL DATA OF COMPONENTS

102 | CALCULATE SIMILARITY BETWEEN WAVELENGTH REGIONS IN SPECTRAL DATA OF COMPONENTS

103 | SET TARGET RANGE OF MATRIX DECOMPOSITION

104 | PERFORM MATRIX DECOMPOSITION IN TARGET RANGE

END components by performing, using the spectral data, matrix decomposition of the actual data in the target range.

6 Claims, 5 Drawing Sheets

(58) Field of Classification Search
CPC .......... G01N 30/8631; G01N 30/8634; G01N 30/8637; G01N 30/8644; G01N 2030/8648; G01N 30/8679; G01N 30/8686; G01N 30/8689; G01N 30/74; G06F 18/213; G06F 18/2133; G06F 18/2134; G06F 18/21342; G06F 18/22; G06F 2218/08; G06F 2218/10; G06F 2218/14
See application file for complete search history.

(56) References Cited

U.S. PATENT DOCUMENTS

| | | | |
|---|---|---|---|
| 2017/0336370 A1 | 11/2017 | Noda | |
| 2017/0356889 A1 | 12/2017 | Nakakimura | |

FOREIGN PATENT DOCUMENTS

| | | | | |
|---|---|---|---|---|
| JP | 2004309250 A | * | 11/2004 | |
| JP | 2010181350 A | * | 8/2010 | |
| WO | 2016035167 A1 | | 3/2016 | |

OTHER PUBLICATIONS

Office Action for corresponding Chinese Patent Application No. 202210789952.0 dated Oct. 12, 2024, with English machine translation.

* cited by examiner

START

101　PREPARE ACTUAL DATA OF
THREE-DIMENSIONAL CHROMATOGRAM
AND SPECTRAL DATA OF COMPONENTS

102　CALCULATE SIMILARITY BETWEEN
WAVELENGTH REGIONS IN SPECTRAL
DATA OF COMPONENTS

103　SET TARGET RANGE OF MATRIX
DECOMPOSITION

104　PERFORM MATRIX DECOMPOSITION IN
TARGET RANGE

END

FIG. 3

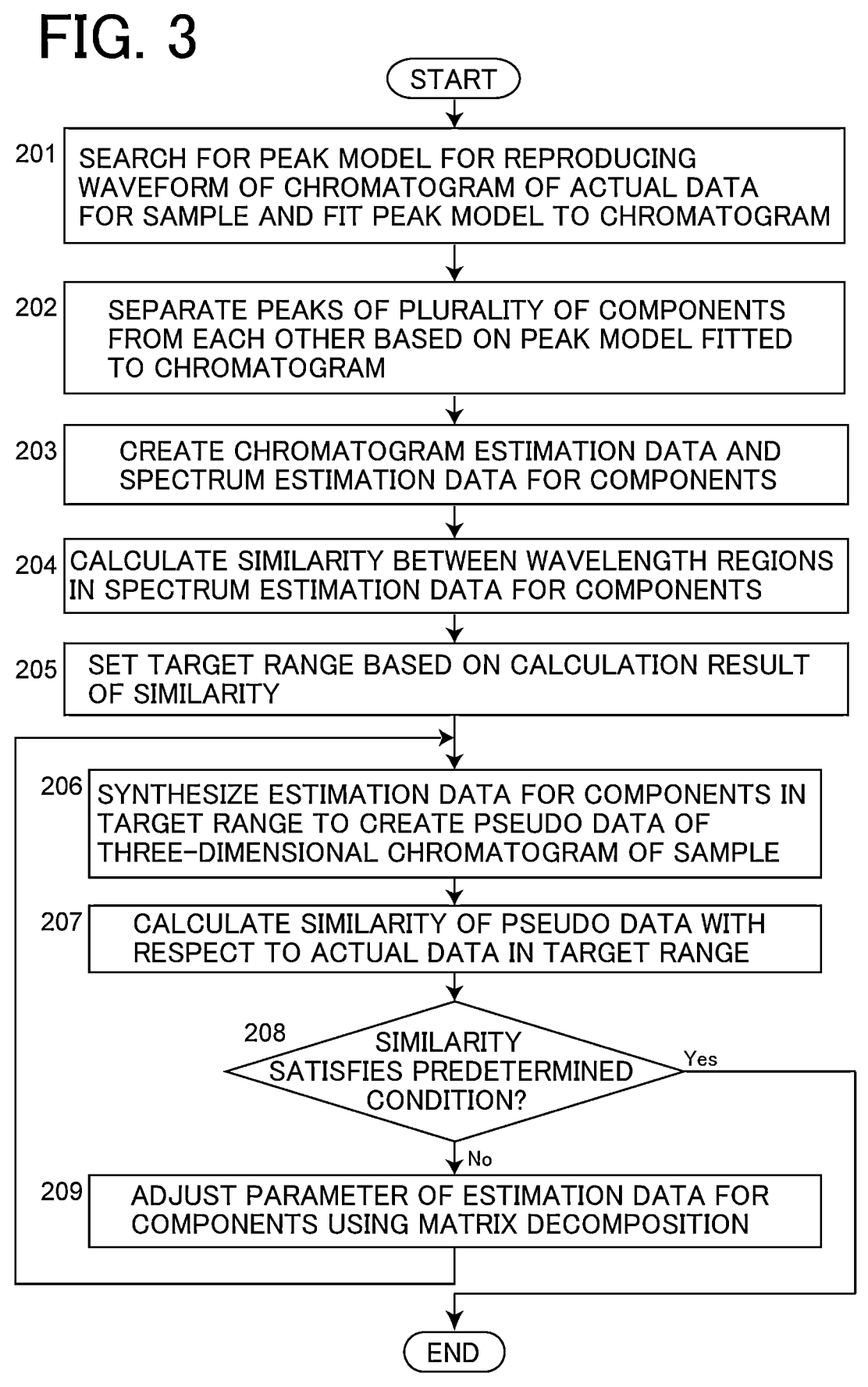

START

201 | SEARCH FOR PEAK MODEL FOR REPRODUCING WAVEFORM OF CHROMATOGRAM OF ACTUAL DATA FOR SAMPLE AND FIT PEAK MODEL TO CHROMATOGRAM

202 | SEPARATE PEAKS OF PLURALITY OF COMPONENTS FROM EACH OTHER BASED ON PEAK MODEL FITTED TO CHROMATOGRAM

203 | CREATE CHROMATOGRAM ESTIMATION DATA AND SPECTRUM ESTIMATION DATA FOR COMPONENTS

204 | CALCULATE SIMILARITY BETWEEN WAVELENGTH REGIONS IN SPECTRUM ESTIMATION DATA FOR COMPONENTS

205 | SET TARGET RANGE BASED ON CALCULATION RESULT OF SIMILARITY

206 | SYNTHESIZE ESTIMATION DATA FOR COMPONENTS IN TARGET RANGE TO CREATE PSEUDO DATA OF THREE-DIMENSIONAL CHROMATOGRAM OF SAMPLE

207 | CALCULATE SIMILARITY OF PSEUDO DATA WITH RESPECT TO ACTUAL DATA IN TARGET RANGE

208 | SIMILARITY SATISFIES PREDETERMINED CONDITION? — Yes

No

209 | ADJUST PARAMETER OF ESTIMATION DATA FOR COMPONENTS USING MATRIX DECOMPOSITION

END

DATA PROCESSING METHOD AND DATA PROCESSING SYSTEM

BACKGROUND OF THE INVENTION

1. Field of the Invention

The present invention relates to a data processing method and a data processing system for a three-dimensional chromatogram.

2. Description of the Related Art

In a liquid chromatograph (LC) using a multichannel detector such as a photodiode array (PDA) detector, three-dimensional chromatogram data having three dimensions of time, wavelength, and signal intensity (absorbance) can be obtained by continuously acquiring an absorption spectrum of a sample eluted from an analytical column.

In a case of quantifying a target component in the sample using the liquid chromatograph, it is common to produce a chromatogram using a wavelength at which absorbance of the target component is maximum, and calculate an area value of a peak of the target component on the chromatogram to perform quantification. However, the sample may contain an impurity other than the target component, and a peak of the impurity may overlap the peak of the target component on the chromatogram. In such a case, since area values of peaks of the target component and the impurity cannot be calculated and a result of the quantification cannot be obtained when a plurality of peaks are overlapped, it is necessary to separate a plurality of components whose peaks are overlapped on the chromatogram from each other.

As a technique for separating the peaks of the plurality of components overlapping each other, there is a technique of mathematically estimating a chromatogram of each component by performing matrix decomposition on original three-dimensional chromatogram data, in addition to a technique of estimating a chromatogram of each component by fitting a model function (a peak model) such as an exponential modified Gaussian (EMG) function to a waveform of an actual chromatogram (see WO 2016/035167 A).

Since separation of the peaks by the matrix decomposition merely involves mathematically separating the original three-dimensional chromatogram data into designated numbers, a shape of each peak after the separation may be completely different from an actual peak shape. On the other hand, a waveform of the chromatogram of the component after the separation does not depend on a peak model, and thus a degree of freedom is high, and there is a possibility that separation accuracy higher than that of the technique of fitting of the peak model can be obtained.

SUMMARY OF THE INVENTION

An object of the present invention is to enable highly accurate separation of peaks of a plurality of components overlapping each other on a chromatogram by matrix decomposition.

The present inventors have come up with an idea of acquiring spectral data for a plurality of components by a certain technique and using the spectral data as a basis of matrix decomposition, before separating peaks of the plurality of components overlapping on a chromatogram using the matrix decomposition. However, when overall waveforms of spectra of the plurality of components to be separated are similar to each other, it is difficult to perform peak separation with high accuracy by simply using the spectral data for the matrix decomposition. Here, the present inventors have found that accuracy of peak separation by the matrix decomposition can be increased by comprehensively evaluating a similarity between wavelength regions corresponding to each other in the spectral data for the plurality of components to be separated, and performing the matrix decomposition using the spectral data in wavelength regions having a low similarity to each other. The present invention has been made based on such a finding.

A data processing method according to the present invention includes: a data preparing step of preparing actual data of a three-dimensional chromatogram including a chromatogram and a spectrum acquired by chromatography analysis for a sample, and spectral data for a plurality of components in the sample whose peaks overlap each other on the chromatogram of the actual data; a similarity calculating step of calculating, for each wavelength region, a similarity between wavelength regions corresponding to each other in the spectral data for the plurality of components prepared in the data preparing step while comprehensively changing the wavelength regions; a target range setting step of setting a target range by searching for a wavelength region having a similarity lower than an overall similarity between the spectral data for the plurality of components based on a calculation result in the similarity calculating step; and a peak separating step of creating chromatogram data for the plurality of components by performing, using the spectral data for the plurality of components, matrix decomposition of the actual data in the target range set in the target range setting step.

A data processing system according to the present invention includes: a data storage part configured to store actual data of a three-dimensional chromatogram including a chromatogram and a spectrum acquired by chromatography analysis for a sample, and spectral data for a plurality of components in the sample whose peaks overlap each other on the chromatogram of the actual data; and a data processor configured to perform separation processing on the peaks of the plurality of components in the sample by using the actual data and the spectral data stored in the data storage part. Then, the data processor is configured to execute a similarity calculating step of calculating, for each wavelength region, a similarity between wavelength regions corresponding to each other in the spectral data for the plurality of components stored in the data storage part while comprehensively changing the wavelength regions, a target range setting step of setting a target range by searching for a wavelength region having a similarity lower than an overall similarity between the spectral data for the plurality of components based on a calculation result in the similarity calculating step, and a peak separating step of creating chromatogram data for the plurality of components by performing, using the spectral data for the plurality of components, matrix decomposition of the actual data in the target range set in the target range setting step.

According to the data processing method and the data processing system of the present invention, actual data of a three-dimensional chromatogram of a sample and spectral data for a plurality of components whose peaks overlap each other on the chromatogram are prepared, a similarity between wavelength regions corresponding to each other in the spectral data for the plurality of components is calculated for each wavelength region while comprehensively changing the wavelength regions, a wavelength region having a low similarity is searched based on a calculation result, a target range is set based on a search result, and matrix decomposition of the actual data using the spectral data is performed in the set target range, and thus the peaks of the plurality of components can be separated with high accuracy.

BRIEF DESCRIPTION OF THE DRAWINGS

FIG. 3 is a flowchart showing an example of data processing by the data processing system;

FIGS. 4A and 4B are diagrams showing an example of peak separation based on fitting of a peak model, in which FIG. 4A shows a chromatogram of actual data at a certain wavelength, and FIG. 4B shows a state in which the peak model is fitted to the chromatogram.

DETAILED DESCRIPTION OF THE INVENTION

Hereinafter, examples of a data processing method and a data processing system for a chromatogram according to the present invention will be described with reference to the drawings.

Figure 1:
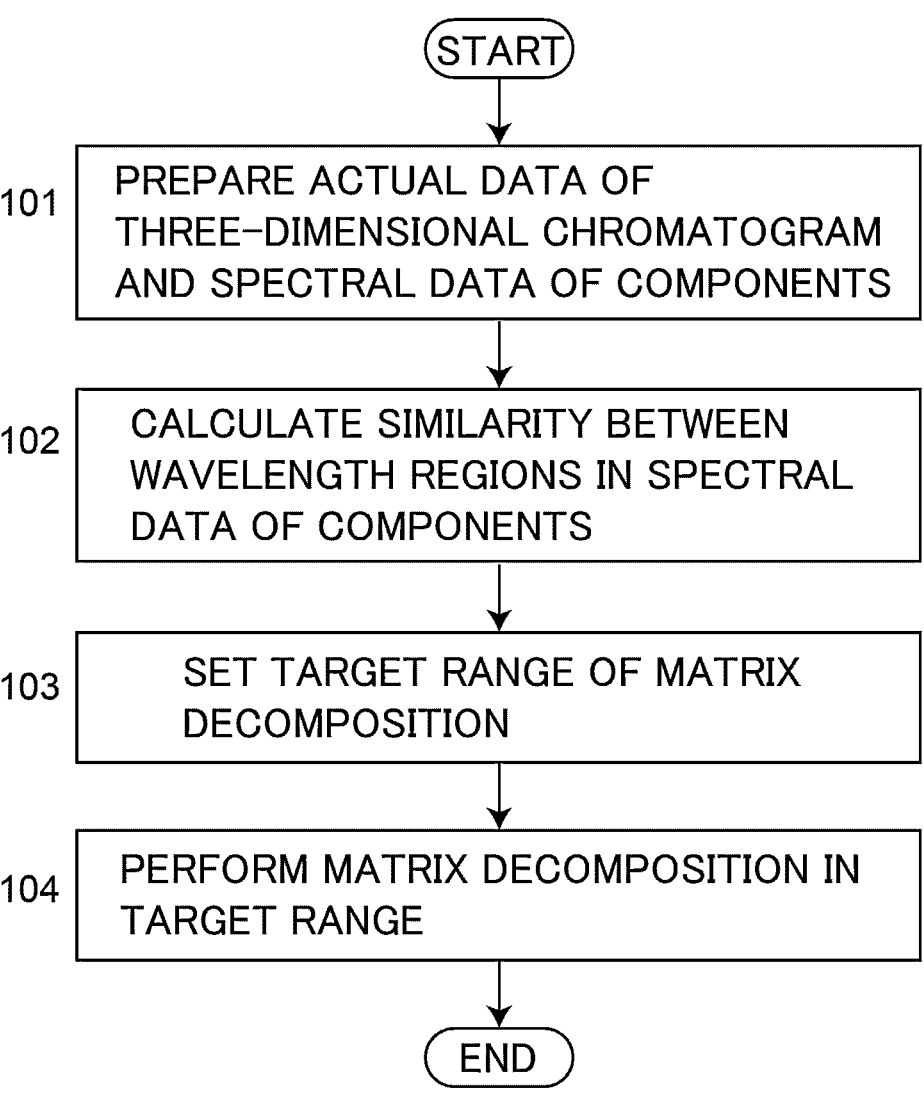
FIG. 1 is a flowchart schematically showing an example of a data processing method.

FIG. 1 schematically shows an example of the data processing method.

The data processing method according to the example is a method for separating peaks of a plurality of components overlapping each other on a chromatogram by using three-dimensional chromatogram data including a spectrum and a chromatogram acquired by performing chromatography analysis on a sample.

In the method, first, actual data of a three-dimensional chromatogram of the sample is prepared, and spectral data for the plurality of components whose peaks overlap each other on the chromatogram of the actual data is prepared (step 101). The spectral data for the plurality of components to be separated may be acquired by any technique. When the plurality of components are known, these components can be individually analyzed to acquire spectral data. When the plurality of components to be separated are unknown, spectrum estimation data can be created by performing peak separation based on fitting of a peak model with respect to the actual data of the three-dimensional chromatogram of the sample, and the estimation data can be used as spectral data for the components. Examples of an algorithm of the peak separation based on the fitting of the peak model include an algorithm disclosed in WO 2016/035167 A.

Next, a similarity between wavelength regions corresponding to each other in the spectral data for the plurality of components to be separated is calculated for each wavelength region while comprehensively changing the wavelength regions (step 102). Thereafter, based on a calculation result of the similarity, a wavelength region (for example, a wavelength region having a lowest similarity among the wavelength regions for which the similarities are calculated) having a similarity lower than a similarity between the spectral data for the components as a whole is searched, and the wavelength region is set as a target range of matrix decomposition (step 103). Then, the matrix decomposition of the three-dimensional chromatogram based on the spectral data for the components is performed in the set target range, and chromatogram data for the components is created (step 104). Non-negative matrix factorization (NMF) or the like may be used as the matrix decomposition. The matrix decomposition may be repeatedly performed until a synthesis result of the created chromatogram data for the components has a fixed degree of approximation with respect to the actual data.

Figure 2:
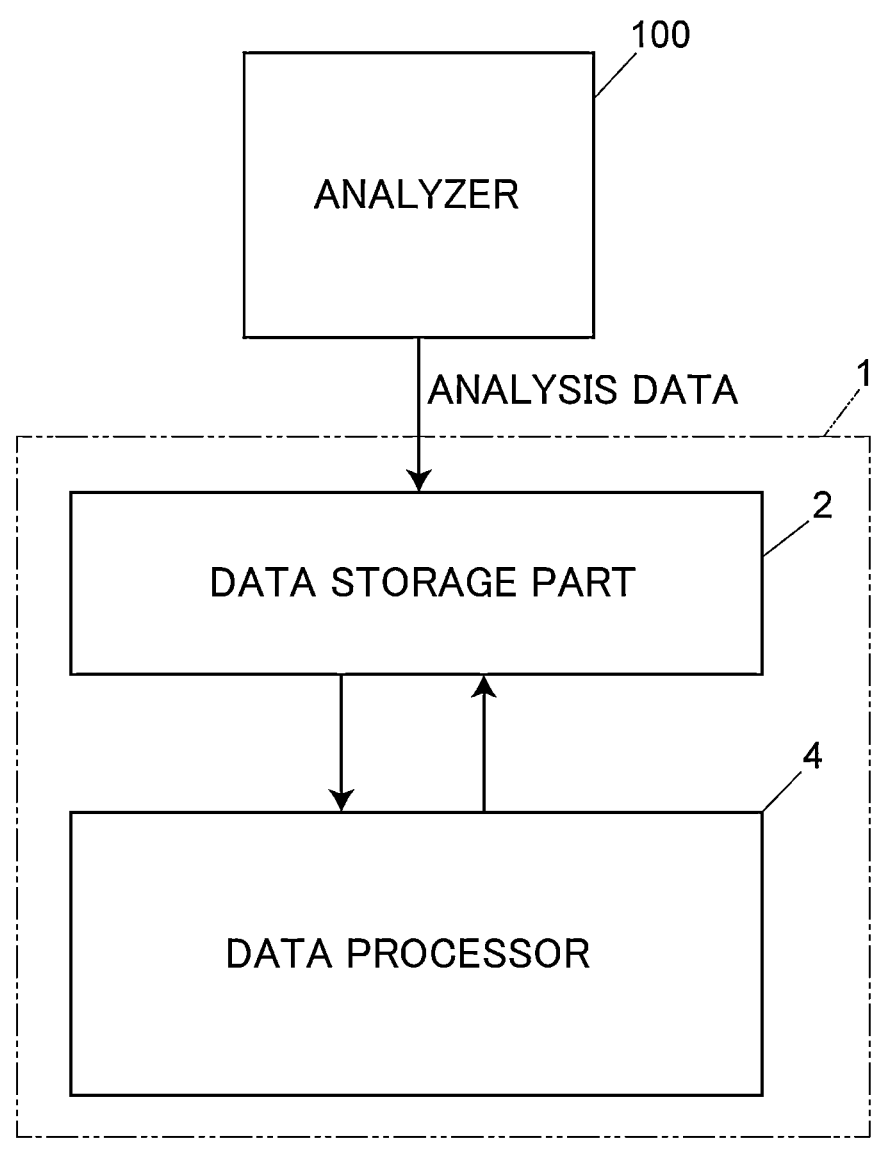
FIG. 2 is a block diagram schematically showing an example of a data processing system that executes the data processing method.

An example of a data processing system for executing the data processing method is shown in FIG. 2.

A data processing system 1 includes a data storage part 2 and a data processor 4. The data processing system 1 receives analysis data acquired by an analyzer 100. The analyzer 100 is configured to perform liquid chromatography analysis on the sample to acquire an absorbance spectrum at regular time intervals. That is, the data processing system 1 receives the three-dimensional chromatogram data including the chromatogram and the spectrum from the analyzer 100.

The data storage part 2 is a storage area for storing the actual data of the three-dimensional chromatogram received from the analyzer 100 and the spectral data for the plurality of components to be separated. The data storage part 2 may be implemented by a nonvolatile memory, a hard disk drive, or the like.

The data processor 4 has a first function of creating chromatogram estimation data and spectrum estimation data for the plurality of components whose peaks overlap each other on the chromatogram of the actual data by using a peak separation algorithm based on fitting of the peak model, and a second function of adjusting, by using a matrix decomposition algorithm, the chromatogram estimation data and the spectrum estimation data for the components created with the first function. The functions of the data processor 4 are implemented by executing a program in a computer circuit including a central processor (CPU).

The data storage part 2 can store the spectrum estimation data for the components created with the first function of the data processor 4 as the spectral data for the components. In the second function of the data processor 4, it is possible to limit the target range of the matrix decomposition using the spectrum estimation data for the components stored in the data storage part 2 and perform the matrix decomposition in the limited target range.

An example of peak separation processing executed in the data processing system 1 will be described with reference to a flowchart in FIG. 3.

Figure 4A:
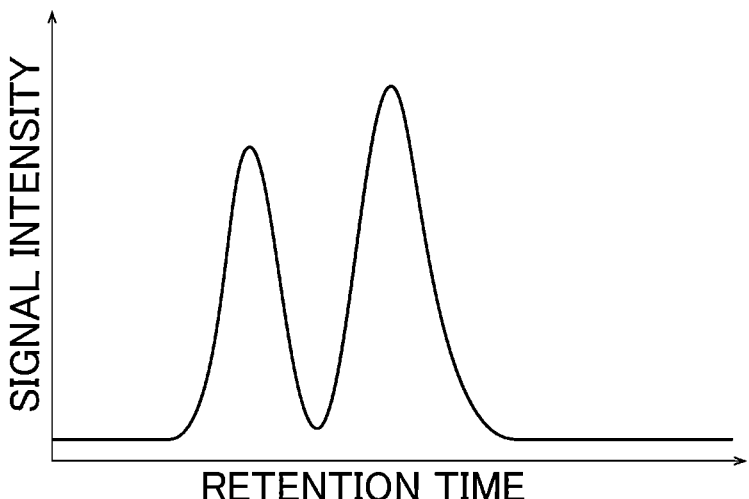
Figure 4B:
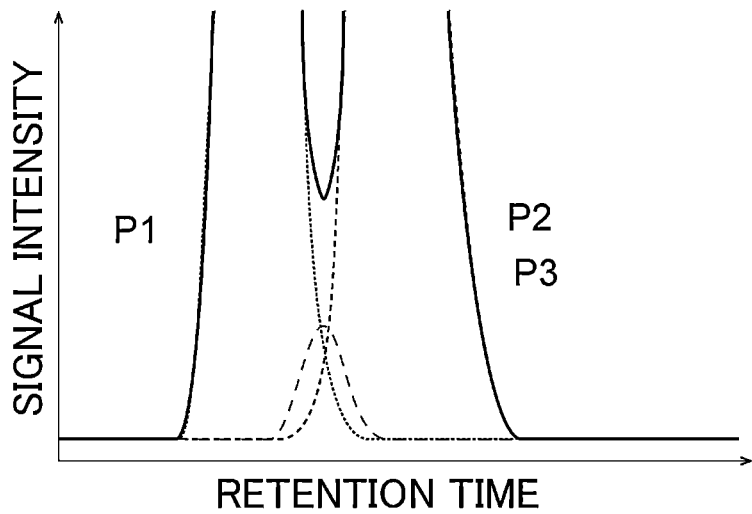

When the peak separation processing is started, the data processor 4 searches a database prepared in advance for a peak model necessary for approximating a waveform of the chromatogram of the actual data, and fits the peak model to the chromatogram (step 201). Then, the peaks of the plurality of components are separated from each other by estimating peak shapes of the plurality of components based on the peak model fitted to the chromatogram (step 202). For example, when a waveform of a chromatogram at a certain wavelength in the actual data is as shown in FIG. 4A, three peak models are fitted to approximate the waveform as shown in FIG. 4B. As a result, it is estimated that the waveform of the chromatogram is formed by overlapping of three peaks P1 to P3, and the waveform of the chromatogram is separated into the three peaks P1 to P3.

The data processor 4 creates chromatogram estimation data and spectrum estimation data for the plurality of components based on a peak separation result by the fitting of the peak model (step 203). Steps 201 to 203 up to this point are performed with the first function of the data processor 4.

Figure 5:
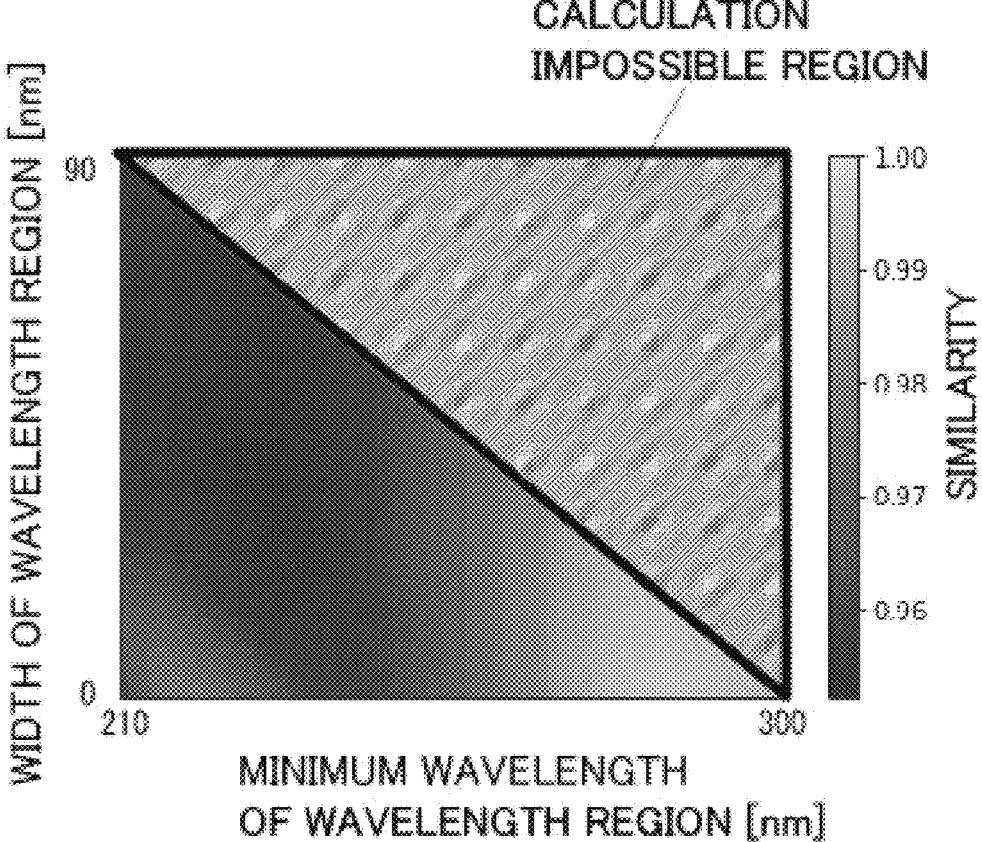
FIG. 5 is a diagram showing an example of a heat map of a calculation result of a similarity in the data processing method.

Next, the data processor 4 calculates, for each wavelength region, a similarity between wavelength regions corresponding to each other in the spectrum estimation data for the components created in step 203 while comprehensively changing the wavelength regions (step 204). The similarity may use a cos similarity. A method for comprehensively changing the wavelength regions in step 204 is not particularly limited, and as an example, a method of changing a minimum wavelength and a width (a range for obtaining the similarity) of the wavelength region may be used. FIG. 5 is an example of a heat map created by calculating the similarity while changing the minimum wavelength and the width of the wavelength region. A horizontal axis of the heat map represents a minimum wavelength of a wavelength region, and a vertical axis represents a width of the wavelength region. A hatched triangular region on an upper right corner of the heat map is a region in which a similarity cannot be calculated because a width of a wavelength region exceeds an actual data region. For example, when a minimum wavelength is 250 nm and a width of a wavelength region is 70 nm, a maximum wavelength of the wavelength region is 320 nm, which exceeds 300 nm, and thus a similarity cannot be calculated. The data processor 4 may have a function of creating such a heat map and displaying the heat map on a display (not shown). Note that the heat map does not necessarily have to be created.

After step 204 is terminated, the data processor 4 specifies a wavelength region having a lowest similarity based on a calculation result in step 204, and sets the wavelength region as the target range of the matrix decomposition (step 205). Note that when a width of a wavelength region is extremely narrow, it is impossible to correctly evaluate a similarity, and thus it is desirable to set a wavelength region having a fixed width (for example, 25 nm) or more as the target range. Note that in step 204, a width of the wavelength region for which the similarity is calculated may be limited to a fixed value (for example, 25 nm) or more. Note that although it is described here that the data processor 4 automatically sets the target range of the matrix decomposition, the present invention is not limited thereto. The data processor 4 may calculate the similarity for each wavelength region in step 204, show a calculation result as shown in FIG. 5 to a user, and cause the user to set the target range.

After setting the target range, the data processor 4 synthesizes the chromatogram estimation data and spectrum estimation data for the components created in step 203 to create pseudo data of the three-dimensional chromatogram (step 206), and calculates a similarity of the pseudo data with respect to the actual data (step 207). The "similarity" here may be any numerical value representing how similar pseudo data is to actual data. Therefore, a method for calculating the similarity is not particularly limited, and for example, a sum of squares of differences between numerical values of pseudo data and numerical values of actual data at points of the three-dimensional chromatogram may be used as the similarity.

The data processor 4 adjusts a parameter of the estimation data for the components using the matrix decomposition such that the similarity obtained in step 207 is increased, that is, the pseudo data is closer to the actual data (step 209). Thereafter, the data processor 4 creates pseudo data of the three-dimensional chromatogram based on the adjusted estimation data (step 206), and evaluates the similarity of the created pseudo data with respect to the actual data (steps 207 and 208). In this way, steps 206 to 209 are repeated, and when the similarity of the pseudo data with respect to the actual data satisfies a predetermined condition, the adjustment for the estimation data is ended (Yes in step 208). Examples of the predetermined condition include a condition that the similarity is below (or above) a preset threshold value, or a condition that the similarity of the pseudo data with respect to the actual data after the adjustment of the estimation data converges to a fixed value. Steps 204 to 209 are performed with the second function of the data processor 4.

According to steps 204 to 209 performed with the second function of the data processor 4, the chromatogram estimation data and the spectrum estimation data for the components created with the first function are adjusted by using data of the wavelength region in which the similarity between the spectral data is low, without being restricted by a shape of the peak model. When the spectral data for the plurality of components to be separated are similar to each other as a whole, it is difficult to accurately estimate a chromatogram of each component even when the matrix decomposition is performed using the spectral data. However, it is possible to increase estimation accuracy of the chromatogram of the component by performing the matrix decomposition by narrowing an analysis target range to a region in which the similarity between the spectral data for the plurality of components is lower than that evaluated for the entire spectral data, that is, a region in which a difference in absorbance characteristics of the components appears.

The examples described above merely illustrate embodiments of the data processing method and the data processing system according to the present invention. The embodiments of the data processing method and the data processing system according to the present invention are as follows.

A data processing method according to an embodiment of the present invention includes:

a data preparing step of preparing actual data of a three-dimensional chromatogram including a chromatogram and a spectrum acquired by chromatography analysis for a sample containing a plurality of components, and spectral data for the plurality of components in the sample whose peaks overlap each other on the chromatogram of the actual data;

a similarity calculating step of calculating, for each wavelength region, a similarity between wavelength regions corresponding to each other in the spectral data for the plurality of components prepared in the data preparing step while comprehensively changing the wavelength regions;

a target range setting step of setting a target range by searching for a wavelength region having a similarity lower than an overall similarity between the spectral data for the plurality of components based on a calculation result in the similarity calculating step; and a peak separating step of creating chromatogram data for the plurality of components by performing, using the spectral data for the plurality of components, matrix decomposition of the actual data in the target range set in the target range setting step.

In a first aspect of the data processing method according to the embodiment, in the data preparing step, a waveform of the chromatogram of the actual data is approximated by fitting a peak model prepared in advance, and spectrum estimation data and chromatogram estimation data for the plurality of components are created by using the peak model fitted to the chromatogram. Then, the spectral data used in the similarity calculating step and the peak separating step is the spectrum estimation data created in the data preparing step, and the chromatogram data created in the peak separating step is based on the chromatogram estimation data created in the data preparing step. According to such an aspect, it is possible to adjust, by using a matrix decomposition algorithm that is not restricted by the peak model, the chromatogram estimation data and the spectrum estimation data for the components created by using a peak separation algorithm based on fitting of the peak model, and high peak separation accuracy can be obtained.

In a second aspect of the data processing method according to the embodiment, non-negative matrix factorization is used as the matrix decomposition. The second aspect may be combined with the first aspect.

In a third aspect of the data processing method according to the embodiment, in the similarity calculating step, the similarity is calculated while changing a minimum wavelength and a wavelength width of the wavelength region. The third aspect may be combined with the first aspect and/or the second aspect.

A data processing system according to an embodiment of the present invention includes:

a data storage part configured to store actual data of a three-dimensional chromatogram including a chromatogram and a spectrum acquired by chromatography analysis for a sample, and spectral data for a plurality of components in the sample whose peaks overlap each other on the chromatogram of the actual data; and a data processor configured to perform separation processing on the peaks of the plurality of components in the sample by using the actual data and the spectral data stored in the data storage part, wherein the data processor is configured to execute a similarity calculating step of calculating, for each wavelength region, a similarity between wavelength regions corresponding to each other in the spectral data for the plurality of components stored in the data storage part while comprehensively changing the wavelength regions, a target range setting step of setting a target range by searching for a wavelength region having a similarity lower than an overall similarity between the spectral data for the plurality of components based on a calculation result in the similarity calculating step, and a peak separating step of creating chromatogram data for the plurality of components by performing, using the spectral data for the plurality of components, matrix decomposition of the actual data in the target range set in the target range setting step.

In a first aspect of the data processing system according to the embodiment, the data processor is configured to execute, before the similarity calculating step, a data preparing step of approximating a waveform of the chromatogram of the actual data by fitting a peak model prepared in advance, and creating spectrum estimation data and chromatogram estimation data for the plurality of components by using the peak model fitted to the chromatogram, use the spectrum estimation data created in the data preparing step as the spectral data in the similarity calculating step and the peak separating step, and create, in the peak separating step, the chromatogram data based on the chromatogram estimation data created in the data preparing step. According to such an aspect, it is possible to adjust, by using a matrix decomposition algorithm that is not restricted by the peak model, the chromatogram estimation data and the spectrum estimation data for the components created by using a peak separation algorithm based on fitting of the peak model, and high peak separation accuracy can be obtained.

In a second aspect of the data processing system according to the embodiment, non-negative matrix factorization is used as the matrix decomposition. The second aspect may be combined with the first aspect.

In a third aspect of the data processing system according to the embodiment, the data processor is configured to calculate the similarity while changing a minimum wavelength and a wavelength width of the wavelength region in the similarity calculating step. The third aspect may be combined with the first aspect and/or the second aspect.

DESCRIPTION OF REFERENCE SIGNS

1: data processing system
2: data storage part
4: data processor
100: analyzer

What is claimed is:

1. A data processing method for improving component quantification using liquid chromatography by improving peak separation, the method comprising:

performing with a computer processor a data preparing step of preparing actual data of a three-dimensional chromatogram formed by a chromatogram and a spectrum acquired by chromatography analysis for a sample containing a first and second component, and preparing a first spectral data for the first component and a second spectral data for the second component, wherein a first peak of the first component and a second peak of the second components overlap each other on the chromatogram of the actual data, and the first peak and the second peak form a non-separated part on the chromatogram of the actual data;

preparing, with the computer processor, actual data of a three-dimensional chromatogram formed by a chromatogram and a spectrum acquired by a chromatograph for a sample containing a first and second component, wherein the three-dimensional chromatogram includes a first peak of the first component and a second peak of the second component and the first peak and the second peak overlap with each other to form a non-separated portion;

preparing, with the computer processor, a first spectral data for the first component and a second spectral data for the second component in the spectrum;

specifying, with the computer processor a first spectral region and a second spectral region in the spectrum;

calculating, with the computer processor, a first similarity between the first spectral data and the second spectral data in the first spectral region;

calculating, with the computer processor, a second similarity between the first spectral data and the second spectral data in the second spectral region, the second similarity is lower than the first similarity;

estimating, with the computer processor, a first estimated shape of the first peak and a second estimated shape of the second peak by applying matrix decomposition to the non-separated portion of the actual data in the second spectral region;

quantifying, with the computer processor, the first and second components by calculating area of the first and second peaks based on the first and second estimated shapes as first and second quantitative values, and displaying the first and second quantitative values on a display.

2. The data processing method according to claim 1, wherein a waveform of the chromatogram of the actual data is approximated by fitting a peak model prepared in advance, and spectrum estimation data and chromatogram estimation data for the first and second components are created by using the peak model fitted to the chromatogram, and the first and second spectral data used in the calculating of the first and second similarity is the spectrum estimation data created in the data preparing step.

3. The data processing method according to claim 1, wherein the matrix decomposition is non-negative matrix factorization.

4. A data processing system for improving component quantification using liquid chromatography by improving peak separation, the system comprising:

a data storage part configured to store:

actual data of a three-dimensional chromatogram formed by a chromatogram and a spectrum acquired by chromatography analysis for a sample including a first and second components, wherein the three-dimensional chromatogram includes a first peak of the first component and a second peak of the second component and the first peak and a second peak overlap with each other to form a non-separated portion; and a first spectral data of the first component and a second spectral data of the second component in the spectrum; and a data processor configured to:

specify a first spectral region and a second spectral region in the spectrum;

calculate a first similarity between the first spectral data and the second spectral data in the first spectral region;

calculate a second similarity between the first spectral data and the second spectral data in the second spectral region, the second similarity is lower than the first similarity;

estimate a first estimated shape of the first peak and a second estimated shape of the second peak by applying matrix decomposition to the non-separated portion of the actual data in the second spectral region;

quantify the first and second components by calculating area of the first and second peaks based on the first and second estimated shapes as first and second quantitative values; and display the first and second quantitative values on a display.

5. The data processing system according to claim 4, wherein the data processor is configured to approximate, before the similarity calculating step, a waveform of the chromatogram of the actual data by fitting a peak model prepared in advance, and create spectrum estimation data and chromatogram estimation data for the first and second components by using the peak model fitted to the chromatogram, and use the spectrum estimation data as the first and second spectral data in the calculating of the first and second similarity and estimating of the first and second estimated shapes.

6. The data processing system according to claim 4, wherein the matrix decomposition is non-negative matrix factorization.

* * * * *